Nov. 23, 1943.  F. E. HAND  2,334,923
METHOD OF MAKING PLANTER RUNNERS
Filed Feb. 23, 1942  2 Sheets-Sheet 1
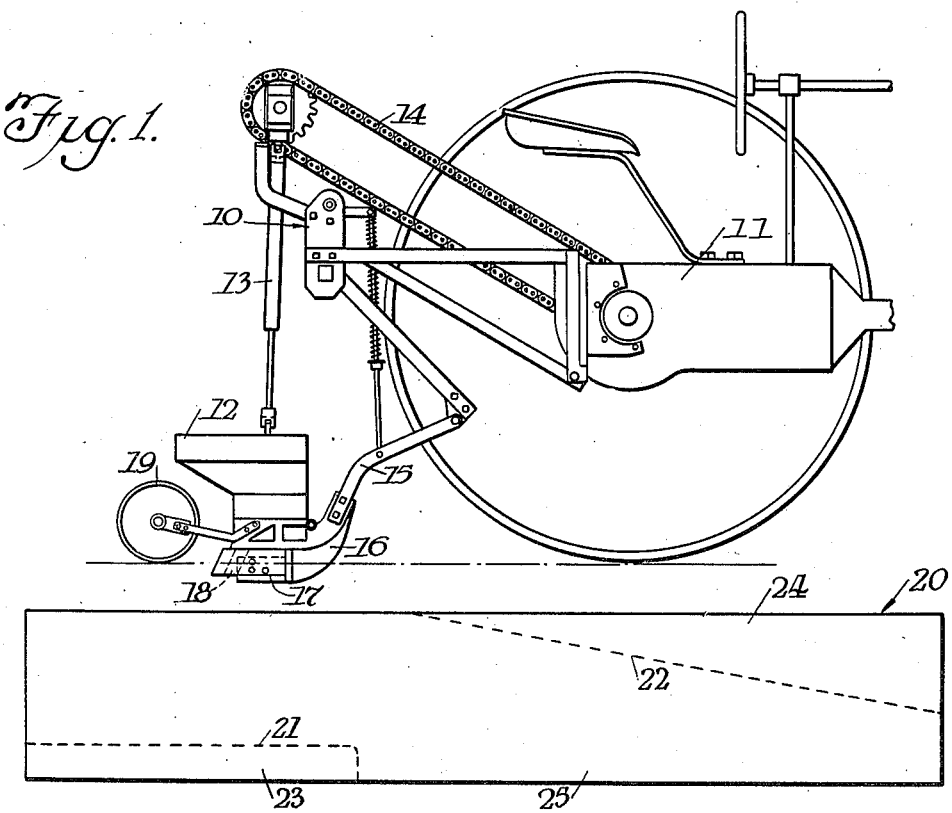
Fig. 1.
Fig. 2.
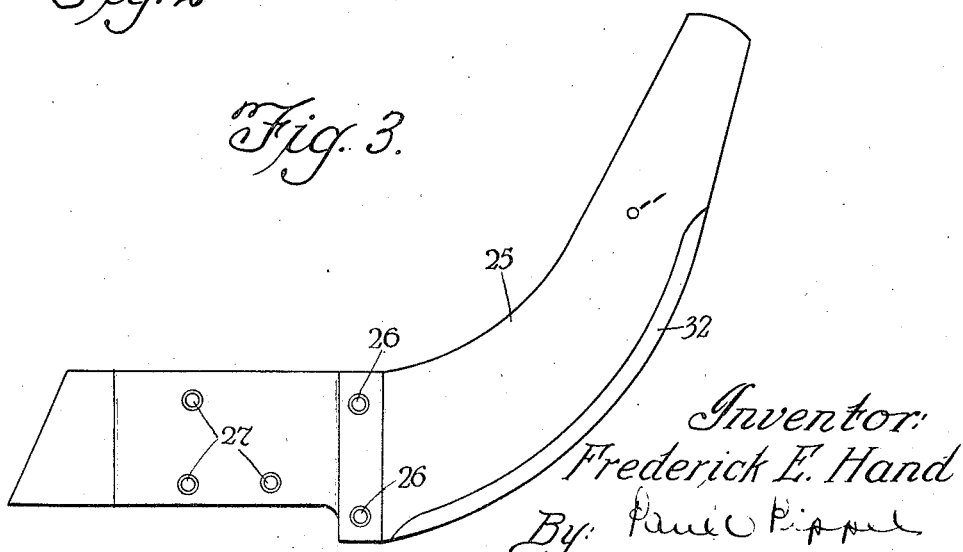
Fig. 3.
Inventor:
Frederick E. Hand
By: [signature]
Atty.

Nov. 23, 1943.  F. E. HAND  2,334,923
METHOD OF MAKING PLANTER RUNNERS
Filed Feb. 23, 1942  2 Sheets-Sheet 2
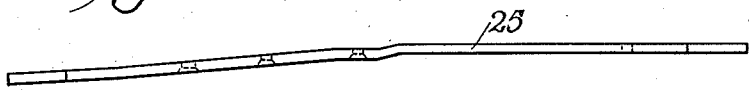
Fig. 4.
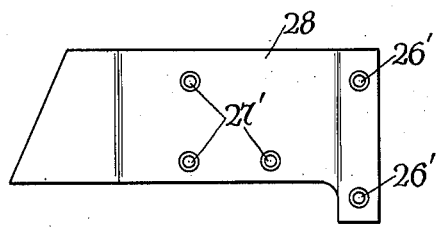
Fig. 5.
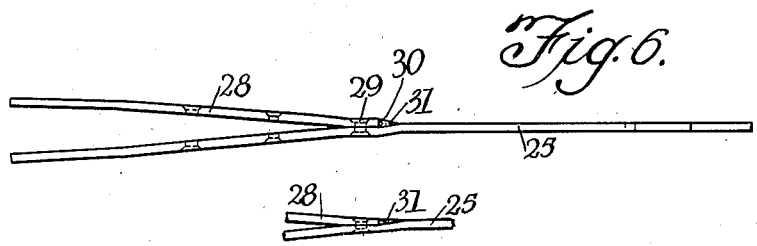
Fig. 6.
Fig. 7.
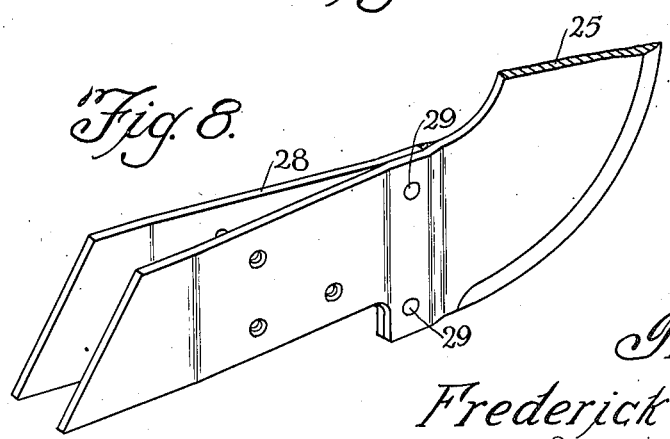
Fig. 8.
Inventor:
Frederick E. Hand
By: Paul O. Pippel
Atty.

Patented Nov. 23, 1943

2,334,923

UNITED STATES PATENT OFFICE 2,334,923

METHOD OF MAKING PLANTER RUNNERS

Frederick E. Hand, Canton, Ill., assignor to International Harvester Company, a corporation of New Jersey Application February 23, 1942, Serial No. 431,966

2 Claims. (Cl. 29—14)

This invention relates to a planter runner and method of making planter runners such as used with runner-type planting machines.

Heretofore, planter runners have been very costly to make in that the two pieces serving to make up the runner have been welded together by the sweat welding method requiring tremendous heat from a heat-treating furnace, costly dies, a drilling operation upon the final assembled pieces, and loss of the distorted pieces resulting from a method of this type.

It is an object of the present invention to provide a method of making planter runners, wherein the costly operations necessary heretofore have been eliminated and to obtain in the end a planter runner which is better constructed and which will be of less cost to the farmer.

According to the present invention, the main runner piece and the rear end piece adapted for attachment to the main piece are preformed by an offset operation and in which holes are at that time provided in the pieces by a punching operation. Some of these holes are for rivets and are spaced alike in their respective pieces so that the pieces can be secured together merely by a cold riveting operation. Once the pieces are connected together, a vertically extending groove is formed in the finished assembly of the pieces, and this is filled with welding material throughout the length of the same. The runner is then ground down to give the final smooth and continuous finish along the sides of the same.

For other objects and for a better understanding of the invention, reference may be had to the following detailed description taken in connection with the accompanying drawings, in which:

Figure 1 is a view of a tractor and planting machine using a runner formed according to the present invention;

Figure 2 is a view of a stock piece from which the main part of the runner is taken;

Figure 3 is a side view of the main runner piece after it has had its forward end turned up and holes punched through the same;

Figure 4 is a top view of the main piece shown in Figure 3 and showing its rear offset portion;

Figure 5 is a view of the rear piece after it has been punched with the holes and offset prior to its connection with the main piece;

Figure 6 is a plan view of the runner after the rear end piece has been riveted to the main piece and with the welding material disposed along the vertically extending groove;

Figure 7 is a fragmentary view similar to Figure 6 and showing the thickness of the adjoining pieces after the same has been ground down to its finished shape; and Figure 8 is a perspective view of the final assembly prior to the grinding operation.

Referring now to Figure 1, there is shown a planter arrangement 10 connected to a rear portion of a tractor 11. This planter arrangement includes a seed hopper 12 adapted to be operated by a vertically extending telescoping shaft arrangement 13 adapted to be driven by chain and sprocket means 14 connected with the rear of the tractor 11. The hopper structure 12 is carried on a vertical planter frame 15 on the bottom end of which is mounted a runner 16 formed according to the method outlined by the present invention. This runner in its final form is Y-shaped and is similar to other such runners, but the method of manufacturing the same is different, as runners generally are of a type adapted to fit beneath the planter hopper and have a forked rear end portion into which extends a furrow smoothing element 17. Also, provision is made for extending through the same the seed spout 18 used for delivery of the seed from the hopper 12 to the seed furrow formed by the runner 16. The depth of planting is controlled by a supporting wheel 19 connected to the runner frame 15.

The main piece of the runner is formed from a piece of stock material 20, shown in Figure 2. The piece 20 is marked with the dotted lines 21 and 22 and the pieces of material 23 and 24 are removed to provide a blank main piece 25. This main piece 25 is then bent edgewise to take a sickle shape curve, such as shown in Figure 3, and to provide thereby the turned up forward portion of the runner. After this operation has been performed, the piece is submitted to a shaping machine, and is offset to take the form shown in Figure 4. During this same operation, holes 26 and 27 are punched into the rear end of the same. This operation can be done with the regular stock material and without the necessity of having to heat the same.

Next is formed a rear end piece 28 offset similarly to the rear end of the main piece 25. This rear end piece also has punched into the same, during the offset operation, corresponding holes 26' and 27'. Once these pieces have been preshaped and the holes punched into the same, the connection of the two together is by a single operation. The pieces are alined with one another so that the holes 26 and 26' of the respective pieces are in alinement and adapted to receive rivets 29. These rivets 29 are also of a type which do not require a preheating operation or, in other words, the pieces are connected together by a cold riveting process. Heretofore, for assembling the runners the pieces 25 and 28 have been assembled by a sweat welding process. The piece 28 was usually scarfed at its forward end, heated to a tremendous heat along with the main piece, and both pieces were welded in a die by a suitable power hammer. All of this required costly equipment, let alone the cost of heating these pieces to the desired heat necessary for the satisfactory welding of the pieces. This welding operation requires the services of highly skilled operators in order to insure against greater loss of material resulting from imperfections which readily might occur if skill was not made use of. Even with the use of a skilled operator, the scrap loss was large. Also, with the prior process the holes 27 and 27' necessarily had to be placed in the assembled runner by a drilling operation which also was costly. According to the present method, the holes are placed in the pieces by a punching operation and are present in the finished runner at the time of the assembly of the pieces.

At the forward end of the short piece 28 and at its intersection with the main piece 25, a groove 30 is formed. To this groove there is added welding material 31 to fill up the groove 30. When this welding material 31 has been added, the assembled runner will have the form shown in Figures 6 and 8.

A finished runner, however, should have a smooth and continuous side surface and this is provided by grinding down the offset portions of the pieces until the same will have a form shown in Figure 7. Once this operation has been performed and a cutting edge 32 is provided in the forward part of the main piece 25, the same is ready for use with the planting machine 10 shown in Figure 1. The runner is then merely assembled to the planting frame 15 and connected to it are the smooth elements 17 and the seed spouts 18.

It should now be apparent that by this method planter runners can be made more cheaply than by methods used heretofore. This has been accomplished by eliminating the heat welding operation such as was used heretofore and by the forming of the device wholly by methods not requiring any heat at all except that necessary to heat the welding material added to the groove 30. This adding of material can be done by the welding apparatus usually found around metal fabricating factories.

While changes may be made which would vary the method employed only slightly, it shall be understood that such changes shall be within the spirit and scope of the present invention as defined by the appended claims.

What is claimed is:

1. In the manufacture of Y-shaped planter runners for use in agricultural implements to open a furrow for the reception of seed, wherein the stem of the Y is bent upwardly and sharpened to form a cutting blade, and the arms of the Y diverge rearwardly and contact the ground, the steps of forming an elongated blank of rectangular cross-section, bending one end of the blank edgewise, offsetting the other end laterally to form the first arm of a Y of which the bent portion is the stem, providing holes adjacent the juncture of the said arm with the stem, forming a second blank of lesser length than the first blank, laterally offsetting said second blank to form the second arm of the Y and a base portion adapted to register with the juncture of the first arm with its stem, providing holes in said base portion arranged to register with the holes in said first arm at said juncture, fastening the arms together at their juncture, and filling with welding material the groove formed by the contact of the vertical edge of the second arm with the side of the first arm.

2. In the manufacture of Y-shaped planter runners for use in agricultural implements to open a furrow for the reception of seed, wherein the stem of the Y is bent upwardly and sharpened to form a cutting blade, and the arms of the Y diverge rearwardly and contact the ground, the steps of forming an elongated blank of rectangular cross-section, bending one end of the blank edgewise, sharpening the forward edge to form a cutting blade, offsetting the other end laterally to form the first arm of a Y of which the bent portion is the stem, providing holes in the said arm and adjacent the juncture of the arm with the stem, forming a second blank of lesser length than the first blank, laterally offsetting said second blank to form the second arm of the Y and a base portion adapted to register with the juncture of the first arm with its stem, providing holes in said arm and said base portion arranged to register with the holes in said first arm, fastening the arms together at their juncture by riveting, filling with welding material the groove formed by the contact of the vertical edge of the second arm with the side of the first arm, and grinding the joined area to provide smooth faces for contact with the soil.

FREDERICK E. HAND.